(12) United States Patent
Ebrahimi Afrouzi et al.

(10) Patent No.: US 12,259,501 B2
(45) Date of Patent: *Mar. 25, 2025

(54) METHOD AND APPARATUS FOR IMPROVING RANGE FINDING SYSTEM READINGS

(71) Applicants: Ali Ebrahimi Afrouzi, Henderson, NV (US); Chen Zhang, Redmond, WA (US); Sebastian Schweigert, Sunnyvale, CA (US)

(72) Inventors: Ali Ebrahimi Afrouzi, Henderson, NV (US); Chen Zhang, Redmond, WA (US); Sebastian Schweigert, Sunnyvale, CA (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,561

(22) Filed: Oct. 6, 2023

(65) Prior Publication Data

US 2024/0077595 A1 Mar. 7, 2024

Related U.S. Application Data

(63) Continuation of application No. 17/712,691, filed on Apr. 4, 2022, now Pat. No. 11,815,631, which is a
(Continued)

(51) Int. Cl.
*G01S 7/497* (2006.01)
*G01S 17/08* (2006.01)

(52) U.S. Cl.
CPC ............. *G01S 7/497* (2013.01); *G01S 17/08* (2013.01)

(58) Field of Classification Search
CPC .... G01S 17/08; G01S 17/4876; G01S 17/497; G01S 17/931; G01S 7/497; G05D 1/0088; G05D 1/024; G05D 1/0248; G05D 1/0274
(Continued)

(56) References Cited

U.S. PATENT DOCUMENTS 10,690,757 B1 * 6/2020 Ebrahimi Afrouzi ........................ G01S 7/4876
11,320,523 B1 * 5/2022 Ebrahimi Afrouzi ........................ G01S 17/931

(Continued)

OTHER PUBLICATIONS

Nam et al.„ KR 101233714B1, "Autonomous Mobile Robot Avoiding Obstacle Trap and Controlling Method for the Same", date published: Feb. 18, 2013 (Year: 2013).*

*Primary Examiner* — John H Le

(57) ABSTRACT

A robot including a chassis; a set of wheels coupled to the chassis; a range finding system coupled to the robot; a plurality of sensors; a processor; and a tangible, non-transitory, machine-readable medium storing instructions that when executed by the processor effectuates operations including: obtaining, with the processor, distances to obstacles measured by the range finding system as the robot moves relative to the obstacles; and determining, with the processor, a position of the obstacle based at least partially on the distance measurements, including: identifying, with the processor, at least one position of the range finding system when encountering the obstacle; and determining, with the processor, the position of the obstacle based at least partially on the at least one position of the range finding system when encountering the obstacle.

20 Claims, 2 Drawing Sheets

Related U.S. Application Data continuation of application No. 16/880,644, filed on May 21, 2020, now Pat. No. 11,320,523, which is a continuation of application No. 15/683,255, filed on Aug. 22, 2017, now Pat. No. 10,690,757.

(60) Provisional application No. 62/379,403, filed on Aug. 25, 2016.

(58) Field of Classification Search
USPC .......................................................... 702/97
See application file for complete search history.

(56) References Cited

U.S. PATENT DOCUMENTS

| | | | |
|---|---|---|---|
| 11,815,631 B1* | 11/2023 | Ebrahimi Afrouzi | ... G01S 17/08 |
| 2010/0235129 A1* | 9/2010 | Sharma | ................... G01S 17/86 |
| | | | 702/97 |
| 2015/0362921 A1* | 12/2015 | Hanaoka | .............. G05D 1/0274 |
| | | | 702/159 |

* cited by examiner

METHOD AND APPARATUS FOR IMPROVING RANGE FINDING SYSTEM READINGS

CROSS-REFERENCE TO RELATED APPLICATIONS

This application is a Continuation of U.S. Non-Provisional patent application Ser. No. 17/712,691, filed Apr. 4, 2022, which is a Continuation of U.S. Non-Provisional patent application Ser. No. 16/880,644, filed May 21, 2020, which is a Continuation of U.S. Non-Provisional patent application Ser. No. 15/683,255, filed Aug. 22, 2017, which claims the benefit of U.S. Provisional Patent Application No. 62/379,403, filed Aug. 25, 2016, each of which is hereby incorporated by reference.

FIELD OF THE DISCLOSURE

The disclosure relates to remote measurement tools, and more particularly, to range finding systems.

BACKGROUND

Range finding systems are used in a variety of settings to remotely obtain distance measurements. Many autonomous robotic devices use range finding systems such as Light Detection and Ranging (LIDAR), sonar, depth cameras, and the like systems to navigate environments and avoid obstacles. Range finding systems are also used to obtain data for generating maps of environments which may be used for navigation. During normal operation, a robotic device with a mounted range finding system drives on flat surfaces and obtains distance measurements to surfaces opposite the range finding system. However, range finding systems may deliver inaccurate distance measurements when tilted. Such instances may occur in cases where a range finding system is installed on a robotic device travelling over an obstacle before resuming movement on a flat surface. When tilted, the range finding system captures a few readings of distances to a point on the surface positioned at an angle other than the appropriate flat surface angle, thereby producing inaccurate readings. In prior art, sensor tilt has been predetermined for common obstacles to correct for measured ranges. However, this method requires calibration to determine sensor tilt for common obstacles and the robotic device may encounter obstacles unknown to the system. Prior art also describes a method whereby the angle of inclination or misalignment, calculated using different types of systems consisting of cameras and/or sensors, is used to adjust the distance measurements of the range finding system. However, this may only be applied if the tilt of the robotic device is uniform across the system and requires additional equipment. The present invention addresses these issues by introducing a more efficient system utilizing a computer-integrated method to identify and discard inaccurate range finding readings.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a robot including a chassis; a set of wheels coupled to the chassis; a range finding system coupled to the robot; a plurality of sensors; a processor; and a tangible, non-transitory, machine-readable medium storing instructions that when executed by the processor effectuates operations including: obtaining, with the processor, distances to obstacles measured by the range finding system as the robot moves relative to the obstacles; and determining, with the processor, a position of the obstacle based at least partially on the distance measurements, including: identifying, with the processor, at least one position of the range finding system when encountering the obstacle; and determining, with the processor, the position of the obstacle based at least partially on the at least one position of the range finding system when encountering the obstacle.

Some aspects provide a tangible, non-transitory, machine-readable medium storing instructions that when executed by a processor of a robot effectuates the above-described operations.

Some aspects include a method implementing the above-described operations.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF SOME EMBODIMENTS

Figure 1A:
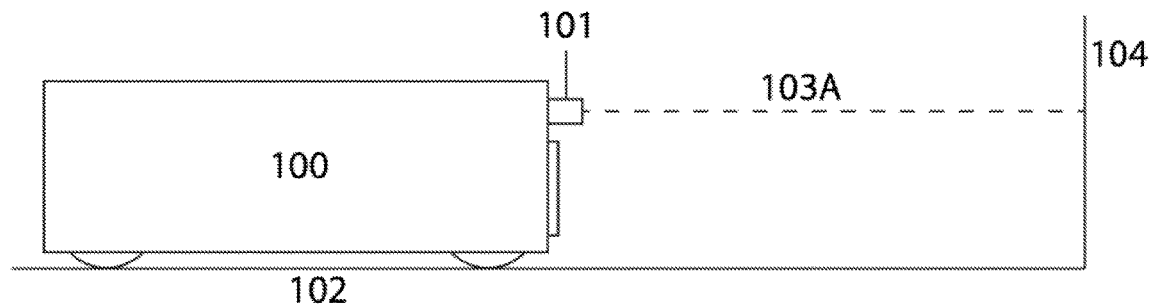
FIG. 1A illustrates a side view of an operating range finding system mounted on a robotic device driving on a flat surface, according to some embodiments.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As understood herein, the term "robot" or "robotic device" may be defined generally to include one or more autonomous or semi-autonomous devices having communication, mobility, and/or processing elements. For example, a robot or robotic device may comprise a casing or shell, a chassis including a set of wheels, a motor to drive wheels, a receiver that acquires signals transmitted from, for example, a transmitting beacon, a processor and/or controller that processes and/or controls motors and other robotic autonomous or cleaning operations, network or wireless communications, power management, etc., and one or more clock or synchronizing devices.

In some embodiments, a range finding system takes distance measurement readings to surfaces opposite the range finding system at predetermined intervals. As the range finding system is moving towards stationary surfaces, a processor examines the successive measurements taken by the range finding system. If the measurements reflect a steady decline in distances occurring at a relatively constant rate, readings are accepted as normal and the system continues to operate normally. If the measurements reflect a steady decline in distances interrupted by no more than a predetermined number of measurements that are at least a predetermined amount or percentage greater than the measurements immediately before and after the interruption, the interrupting measurements are discarded and only the steadily declining measurements are accepted as normal. In another case, as the range finding system is moving away from stationary surfaces, a processor examines the successive measurements taken by the range finding system. If the measurements reflect a steady increase in distances occurring at a relatively constant rate, readings are accepted as normal and the system continues to operate normally. If the measurements reflect a steady increase in distances interrupted by no more than a predetermined number of measurements that are at least a predetermined amount or percentage greater than the measurements immediately before and after the interruption, the interrupting measurements are discarded and only the steadily increasing measurements are accepted as normal.

Some embodiments propose a computer-implemented method to improve range finding system distance readings, particularly when distances may be obscured during instances when the range finding system is tilted. Such instances may occur in cases wherein a range finding system such as a LIDAR, sonar, depth camera, and the like system is installed on, for example, a robotic device travelling over an obstacle before resuming movement on a flat surface. In some embodiments, a range finding system takes distance measurement readings to surfaces opposite the range finding system at predetermined intervals. In some embodiments, the range finding system is moved relative to stationary surfaces. This may occur while taking distance measurements. In some embodiments, a processor examines the successive measurements taken by the range finding system. This may occur while taking distance measurements and during movement of the range finding system. If the measurements reflect a steady decline in distances occurring at a relatively constant rate, readings are accepted as normal and the system continues to operate normally. If the measurements reflect a steady decline in distances interrupted by no more than a predetermined number of measurements that are at least a predetermined amount or percentage greater than the measurements immediately before and after the interruption, the interrupting measurements are discarded and only the steadily declining measurements are accepted as normal.

Some embodiments propose a computer-implemented method to improve range finding system distance readings, particularly when distances may be obscured during instances when the range finding system is tilted. Such instances may occur in cases wherein the range finding system is installed on a robotic device travelling over an obstacle before resuming movement on a flat surface. In some embodiments, a range finding system takes distance measurement readings to surfaces opposite the range finding system at predetermined intervals. In some embodiments, while taking distance measurements, the range finding system is moving away from stationary surfaces. In some embodiments, a processor examines the successive measurements taken by the range finding system. This may occur while taking distance measurements and the range finding system moves relative to surfaces. If the measurements reflect a steady increase in distances occurring at a relatively constant rate, readings are accepted as normal and the system continues to operate normally. If the measurements reflect a steady increase in distances interrupted by no more than a predetermined number of measurements that are at least a predetermined amount or percentage greater than the measurements immediately before and after the interruption, the interrupting measurements are discarded and only the steadily increasing measurements are accepted as normal.

The steps described above may be performed in various settings, such as with a range finding system installed on a robotic floor cleaning device.

FIG. 1A illustrates an example of a side view of robotic device 100 with a range finding system, such as LIDAR 101, mounted on the robotic device 100. Robotic device 100 is operating normally on flat surface 102. When the robotic device 100 is operating on flat surface 102, range finding emissions 103A are approximately parallel to working surface 102 and are used to survey the distance from the range finding system to surface 104 across from it. As the robotic device 100 moves along surface 102, LIDAR 101 surveys surfaces in the same plane.

Figure 1B:
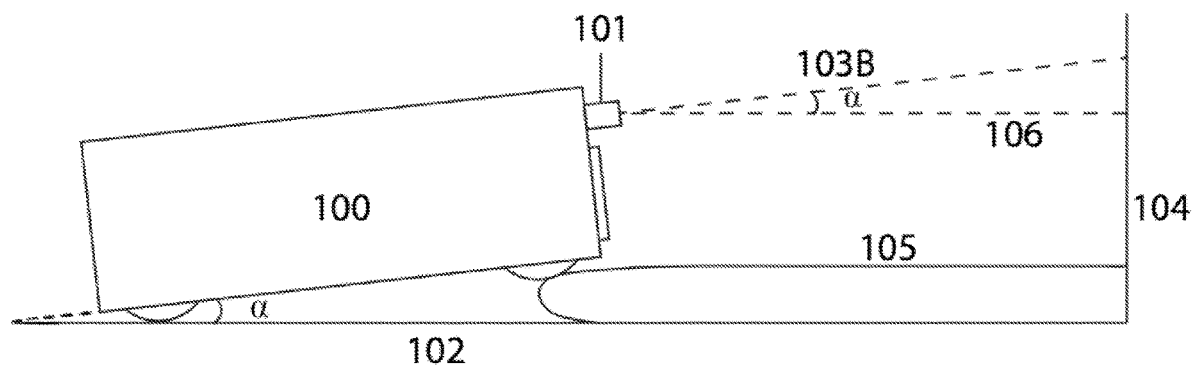
FIG. 1B illustrates a side view of an operating range finding system mounted on a robotic device driving over a surface obstacle, according to some embodiments.

FIG. 1B illustrates an example of a side view of robotic device 100 with a range finding system, such as a LIDAR 101, mounted on robotic device 100. Robotic device 100 is driving onto obstacle 105 positioned on work surface 102. Line 106 is parallel to work surface 102 and is provided for reference. Range finding emissions 103B are no longer parallel to work surface 102 and LIDAR 101 captures distances greater than distance 106, which represents the horizontal distance from the LIDAR 101 to surface 104. Using the present method, this momentary increase in distances obtained by LIDAR 101 is flagged and discarded such that the readings are not used for navigation or mapping purposes.

Figure 2A:
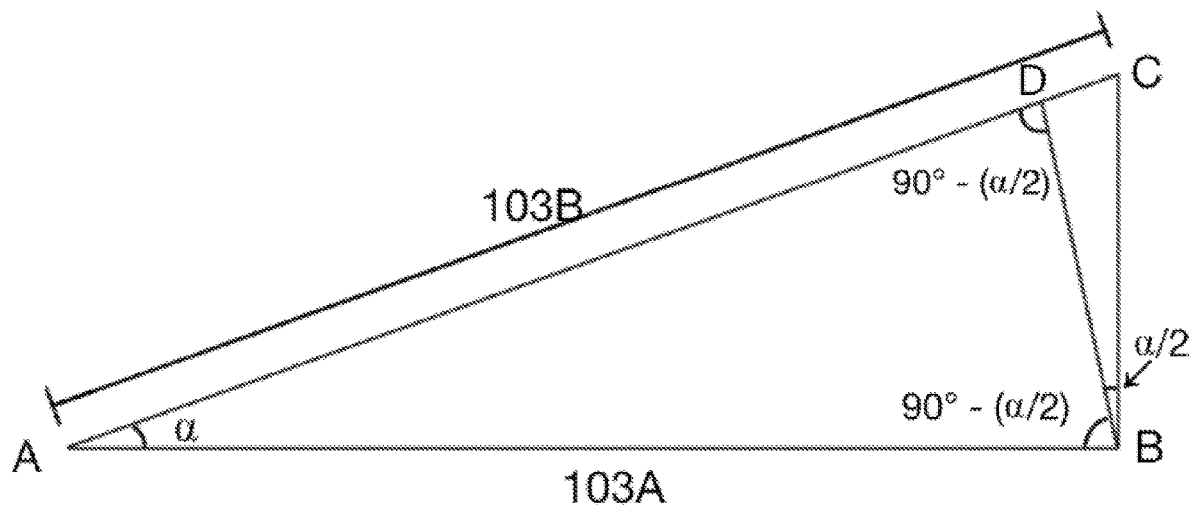
FIGS. 2A and 2B illustrate the difference between range finding system measurements collected during a normal operation of a robotic device and range finding system measurements collected while the robotic device drives onto an obstacle.

FIG. 2A illustrates the difference in distance 103A measured by the range finding system during a normal operation of a robotic device 100 and the distance 103B measured by the range finding system when the robotic device 100 drives onto an obstacle. An interval DC presents the difference between the range finding system measured distance 103B when the robotic device 100 drives onto an obstacle and the range finding system measured distance 103A during normal operation of the robotic device 100. Given that intervals AD and AB are equal (where AB equals 103A and AD+DC equals 103B in FIG. 2A), interval DB=AB sin $\alpha$/cos($\alpha$/2).

Figure 2B:
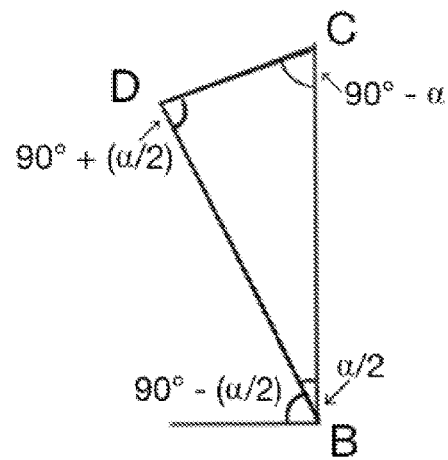

FIG. 2B illustrates triangle DCB from FIG. 2A to help evaluate the interval DC based on the distance 103A and the angle of elevation a. Given triangle DCB, DC=AB(1−cos $\alpha$)/cos $\alpha$ where AB equals 103A. It can be seen if angle $\alpha$ is small then interval DC is small too. When angle $\alpha$ equals 60° then intervals AD and DC are equal where AD equals 103A. When angle $\alpha$ approaches 90° then interval DC becomes unlimitedly large. It can be observed that interval DC, representing a range finding system measurement error, is proportional to interval AB where AB equals 103A. Thus, errors are larger for large distances from a measured surface and the errors decrease when a robotic device approaches the surface. This observation makes it possible to perform monitoring of range finding system measurement more often at the larger distances from a robotic device to the surface and less often at the shorter distances to the surface. Another consequence allows making a threshold for range finding system measurement larger at the larger distances from a robotic device to the surface and smaller at the shorter distances to the surface.

The method proposed herein may be used to measure the length of the obstacle in the direction of movement of the robotic device by identifying the distance measured by the range finding system immediately before and after encountering the obstacle, signified by detected interruptions, and finding the absolute difference between the two distance measurements.

The method proposed may be used with a robotic device's range finding systems containing additional instrumentation for measuring 2D position to determine the position of obstacles by identifying the positions of the range finding system immediately before and after encountering the obstacle, signified by detected interruptions.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

The invention claimed is:

1. A robot, comprising:
a chassis;
a set of wheels coupled to the chassis;
a range finding system coupled to the robot;
a plurality of sensors;
a processor; and
a tangible, non-transitory, machine-readable medium storing instructions that when executed by the processor effectuates operations comprising:
   obtaining, with the processor, sensor readings with distances to obstacles measured by the range finding system as the robot moves relative to the obstacles;
   examining, with the processor, successive distance measurements taken by the range finding system;
   accepting, with the processor, the readings if the distance measurements reflect a steady rate of change in the distances, as the robot moves relative to the obstacles; and
   determining, with the processor, a position of the obstacle based at least partially on the distance measurements, wherein:
      further identifying, with the processor, at least one position of the range finding system when encountering the obstacle; and
      further determining, with the processor, the position of the obstacle based at least partially on the at least one position of the range finding system when encountering the obstacle.

2. The robot of claim 1, wherein the operations further comprise:
monitoring, with the processor, the distance measurements; and
identifying, with the processor, outlier distance measurements in otherwise steadily fitting distance measurements.

3. The robot of claim 2, wherein at least one of:
the processor monitors the distance measurements more frequently with increasing distance of the range finding system from obstacles;
the outlier distance measurements comprise at least a predetermined number of outlier distance measurements;
the outlier distance measurements are at least a predetermined amount or percentage greater than the distance measurements immediately preceding and following the outlier distance measurements; and
the predetermined amount or percentage increases with increasing distance of the range finding system from obstacles.

4. The robot of claim 1, wherein the operations further comprise:
determining, with the processor, a depth of an obstacle based on the distance measurements.

5. The robot of claim 4, wherein at least one of:
determining the depth of the obstacle further comprises:
   identifying, with the processor, the distances measured with the range finding system immediately before and after encountering the obstacle; and
   determining, with the processor, an absolute difference between the distances measured with the range finding system immediately before and after encountering the obstacle;
the distances measured with the range finding system immediately before and after encountering the obstacle are identified by the outlier distance measurements; and
the depth is measured in a same direction as a driving direction of the robot.

6. The robot of claim 1, wherein the at least one position of the range finding system when encountering the obstacle comprises a position of the range finding system when first encountering the obstacle and last encountering the obstacle, as identified by the outlier distance measurements.

7. The robot of claim 1, wherein the operations further comprise at least one of:
recording, with the processor, the position of the obstacle to avoid the obstacle in the future;
determining, with the processor, a tilt angle of the range finding system; and
determining, with the processor, an error in the distance measurements.

8. A tangible, non-transitory, machine-readable medium storing instructions that when executed by a processor of a robot effectuates operations comprising:
obtaining, with the processor, sensor readings with distances to obstacles measured by a range finding system disposed on the robot as the robot moves relative to the obstacles; and
examining, with the processor, successive distance measurements taken by the range finding system;
accepting, with the processor, the readings if the distance measurements reflect a steady rate of change in the distances, as the robot moves relative to the obstacles; and
determining, with the processor, a position of the obstacle based at least partially on the distance measurements, wherein:
   further identifying, with the processor, at least one position of the range finding system when encountering the obstacle; and
   further determining, with the processor, the position of the obstacle based at least partially on the at least one position of the range finding system when encountering the obstacle.

9. The media of claim 8, wherein the operations further comprise:
monitoring, with the processor, the distance measurements; and identifying, with the processor, outlier distance measurements in otherwise steadily fitting distance measurements.

10. The media of claim 9, wherein at least one of:
the processor monitors the distance measurements more frequently with increasing distance of the range finding system from obstacles;
the outlier distance measurements comprise at least a predetermined number of outlier distance measurements;
the outlier distance measurements are at least a predetermined amount or percentage greater than the distance measurements immediately preceding and following the outlier distance measurements; and
the predetermined amount or percentage increases with increasing distance of the range finding system from obstacles.

11. The media of claim 8, wherein the operations further comprise:
determining, with the processor, a depth of an obstacle based on the distance measurements.

12. The media of claim 11, wherein determining the depth of the obstacle further comprises:
identifying, with the processor, the distances measured with the range finding system immediately before and after encountering the obstacle; and
determining, with the processor, an absolute difference between the distances measured with the range finding system immediately before and after encountering the obstacle.

13. The media of claim 12, wherein:
the distances measured with the range finding system immediately before and after encountering the obstacle are identified by the outlier distance measurements; and
the depth is measured in a same direction as a driving direction of the robot.

14. The media of claim 8, wherein the operations further comprise at least one of:
recording, with the processor, the position of the obstacle to avoid the obstacle in the future;
determining, with the processor, a tilt angle of the range finding system; and
determining, with the processor, an error in the distance measurements.

15. A distance measuring method of a robot, comprising:
obtaining, with a processor of the robot, sensor readings with distances to obstacles measured by a range finding system disposed on the robot as the robot moves relative to the obstacles;
monitoring, with a processor of the robot, the distance measurements;
examining, with the processor, successive distance measurements taken by the range finding system;
accepting, with the processor, the readings if the distance measurements reflect a steady rate of change in the distances, as the robot moves relative to the obstacles;
identifying, with the processor, outlier distance measurements in otherwise steadily fitting distance measurements;
determining, with the processor, a depth of an obstacle based on the monitored distance measurements; and
determining, with the processor, a position of the obstacle based at least partially on the distance measurements, comprising: wherein:
further identifying, with the processor, at least one position of the range finding system when encountering the obstacle; and
further determining, with the processor, the position of the obstacle based at least partially on the at least one position of the range finding system when encountering the obstacle.

16. The method of claim 15, further comprising:
monitoring, with the processor, the distance measurements; and
identifying, with the processor, outlier distance measurements in otherwise steadily fitting distance measurements.

17. The method of claim 16, wherein at least one of:
the processor monitors the distance measurements more frequently with increasing distance of the range finding system from obstacles;
the outlier distance measurements comprise at least a predetermined number of outlier distance measurements;
the outlier distance measurements are at least a predetermined amount or percentage greater than the distance measurements immediately preceding and following the outlier distance measurements; and
the predetermined amount or percentage increases with increasing distance of the range finding system from obstacles.

18. The method of claim 15, wherein the operations further comprise:
determining, with the processor, a depth of an obstacle based on the distance measurements.

19. The method of claim 18, wherein at least one of:
determining the depth of the obstacle further comprises:
identifying, with the processor, the distances measured with the range finding system immediately before and after encountering the obstacle; and
determining, with the processor, an absolute difference between the distances measured with the range finding system immediately before and after encountering the obstacle;
the distances measured with the range finding system immediately before and after encountering the obstacle are identified by the outlier distance measurements; and
the depth is measured in a same direction as a driving direction of the robot.

20. The method of claim 15, further comprising at least one of:
recording, with the processor, the position of the obstacle to avoid the obstacle in the future;
determining, with the processor, a tilt angle of the range finding system; and
determining, with the processor, an error in the distance measurements.

* * * * *